United States Patent [19]
Jones

[11] Patent Number: 5,719,833
[45] Date of Patent: Feb. 17, 1998

[54] APPARATUS FOR SECURING A CARTRIDGE ENGAGING ASSEMBLY WITHIN A CARTRIDGE HANDLING SYSTEM

[75] Inventor: David P. Jones, Bellvue, Colo.

[73] Assignee: Hewlett-Packard Company, Palo Alto, Calif.

[21] Appl. No.: 748,222

[22] Filed: Nov. 12, 1996

Related U.S. Application Data

[62] Division of Ser. No. 371,349, Jan. 11, 1995, abandoned.

[51] Int. Cl.⁶ .............................. G11B 5/48; G11B 17/00
[52] U.S. Cl. .............................. 369/36; 360/92
[58] Field of Search .............................. 369/36, 38, 178, 369/192; 360/92; 414/277, 280

[56] References Cited

U.S. PATENT DOCUMENTS

| | | | |
|---|---|---|---|
| 5,043,962 | 8/1991 | Wanger et al. | 369/36 |
| 5,056,073 | 10/1991 | Fitzgerald et al. | 369/36 |
| 5,101,387 | 3/1992 | Wanger et al. | 369/36 |
| 5,184,336 | 2/1993 | Wanger et al. | 369/34 |
| 5,644,559 | 7/1997 | Christie, Jr. et al. | 369/36 |

*Primary Examiner*—Stuart S. Levy
*Assistant Examiner*—William J. Klimowicz

[57] ABSTRACT

A cartridge engaging assembly lock-down apparatus for a cartridge handling system. The lock-down apparatus is adapted to secure a cartridge engaging assembly to a fixed housing portion of the cartridge handling system. The lock-down apparatus includes a first member which is engageable with the cartridge engaging assembly, a second member attached to both the first member and the fixed housing portion, and an actuator to lock and unlock the lock-down apparatus.

2 Claims, 8 Drawing Sheets

APPARATUS FOR SECURING A CARTRIDGE ENGAGING ASSEMBLY WITHIN A CARTRIDGE HANDLING SYSTEM

This application is a divisional of U.S. patent application Ser. No. 08/371,349 filed Jan. 11, 1995, now abandoned, which is hereby specifically incorporated by reference for all that is disclosed therein.

FIELD OF THE INVENTION

The present invention relates generally to multiple cartridge storage and handling systems, and more particularly to a securing device for use in such systems.

BACKGROUND OF THE INVENTION

Optical disks are commonly used for storing musical works, audio-visual works, and computer-readable data. Such optical disks may be mounted in parallelepiped-shaped cartridges for purposes of storing and handling the disks. Also used in the computer industry for data storage are tape cartridges such as Digital Audio Tape (DAT) cartridges and 8-mm tape cartridges.

For large databases consisting of many disk or tape cartridges, a cartridge handling system may be provided for handling and storing the cartridges. Various features and components of a cartridge handling system are disclosed in U.S. Pat. Nos. 4,998,232 dated Mar. 5, 1991 for OPTICAL DISK HANDLING APPARATUS WITH FLIP LATCH of Methlie et al.; 5,014,255 dated May 7, 1991 for OPTICAL DISK CARTRIDGE HANDLING APPARATUS WITH PASSIVE CARTRIDGE ENGAGEMENT ASSEMBLY of Wanger et al.; 5,010,536 dated Apr. 23, 1991 for CARTRIDGE HANDLING SYSTEM of Wanger et al.; 5,043,962 dated Aug. 27, 1991 for CARTRIDGE HANDLING SYSTEM of Wanger et al.; 5,062,093 dated Oct. 29, 1991 for OPTICAL DISK INSERTION APPARATUS of Christie et al.; 5,101,387 dated Mar. 31, 1992 for LATERAL DISPLACEMENT CONTROL ASSEMBLY FOR AN OPTICAL DISK HANDLING SYSTEM of Wanger et al.; 5,184,336 dated Feb. 2, 1993 for LATERAL DISPLACEMENT CONTROL ASSEMBLY FOR AN OPTICAL DISK HANDLING SYSTEM of Wanger et al.; 5,638,349 dated Jun. 10, 1997 for CARTRIDGE HANDLING SYSTEM WITH DUAL CARTRIDGE ENGAGING ASSEMBLY of Rugg et al.; and 5,596,556 dated Jan. 21, 1997 for LINEAR DISPLACEMENT AND SUPPORT APPARATUS FOR USE IN A CARTRIDGE HANDLING SYSTEM of Luffel et al., which are each hereby specifically incorporated by reference for all that is disclosed therein.

In general, a cartridge handling system may include a cartridge storage system for storing a plurality of cartridges within a plurality of corresponding storage locations in a fixed storage array. A cartridge handling system may also include a cartridge engaging assembly which is adapted to, for example, retrieve cartridges from and insert cartridges into their corresponding storage locations, vertically and horizontally displace cartridges, and retrieve cartridges from and insert cartridges into disk or tape drives.

During transportation of a cartridge handling system, for example from a manufacturer or vendor to a customer, a considerable amount of jarring and jostling of the system may take place. To avoid damage which may be incurred if cartridges are dislodged from their storage locations during transportation, cartridges are typically loaded into their corresponding storage locations only after the cartridge handling system has reached its destination. Thus, a cartridge handling system may arrive at a customer's place of business fully assembled but with empty cartridge storage locations. On-site loading of the cartridges typically involves manually placing each cartridge into a "mail slot" whereby each cartridge is delivered to its corresponding storage location. It would be generally desirable to provide a cartridge handling system which may be mass-loaded with cartridges prior to transportation of the system, for example during assembly of the system. It would be particularly desirable to provide a cartridge handling system having cartridge storage locations which maintain cartridges in a relatively fixed position during transportation of the system.

To avoid damage to the cartridge engaging assembly during transportation of a cartridge handling system, the cartridge engaging assembly may be secured (or "locked down") to a fixed portion of the cartridge handling system such as the housing. A device which performs this function will be referred to herein as a "lock-down apparatus". Typically, a cartridge handling system is provided with a temporary lock-down apparatus such as, for example, brackets and/or screws which temporarily connect the cartridge engaging assembly to the housing. For the cartridge engaging assembly to be operable, the temporary lock-down apparatus (e.g., brackets and/or screws) must be removed from the system. Since this device is typically located inside the housing, it can be easily overlooked and forgotten by customers, resulting in time lost, frustration, and needless service calls. It would thus be generally desirable to avoid the use of a temporary lock-down apparatus for a cartridge engaging assembly. It would be particularly desirable to provide a self-locking cartridge engaging assembly including a lock-down apparatus which may be controlled through displacement of the cartridge engaging assembly.

SUMMARY OF THE INVENTION

The present invention is directed to an apparatus for securing a cartridge engaging assembly of a cartridge handling system to a fixed housing portion of the cartridge handling system. The apparatus may include a first lock-down member slidably mounted on a second lock-down member, which is securely attached to a fixed housing portion of the cartridge handling system. In a locked operating state, the first lock-down member is engaged with the cartridge engaging assembly, thus securing the cartridge engaging assembly to the fixed housing portion. An actuator may be provided which engages and displaces the first lock-down member to selectively place the first lock-down member in a locked operating state or an unlocked operating state. The lock-down member actuator may be mounted on a remotely-controllable cartridge engaging assembly.

BRIEF DESCRIPTION OF THE DRAWINGS

Illustrative and presently preferred embodiments of the invention are shown in the accompanying drawings in which.

DETAILED DESCRIPTION OF THE INVENTION

Cartridge Handling System

Figure 1:
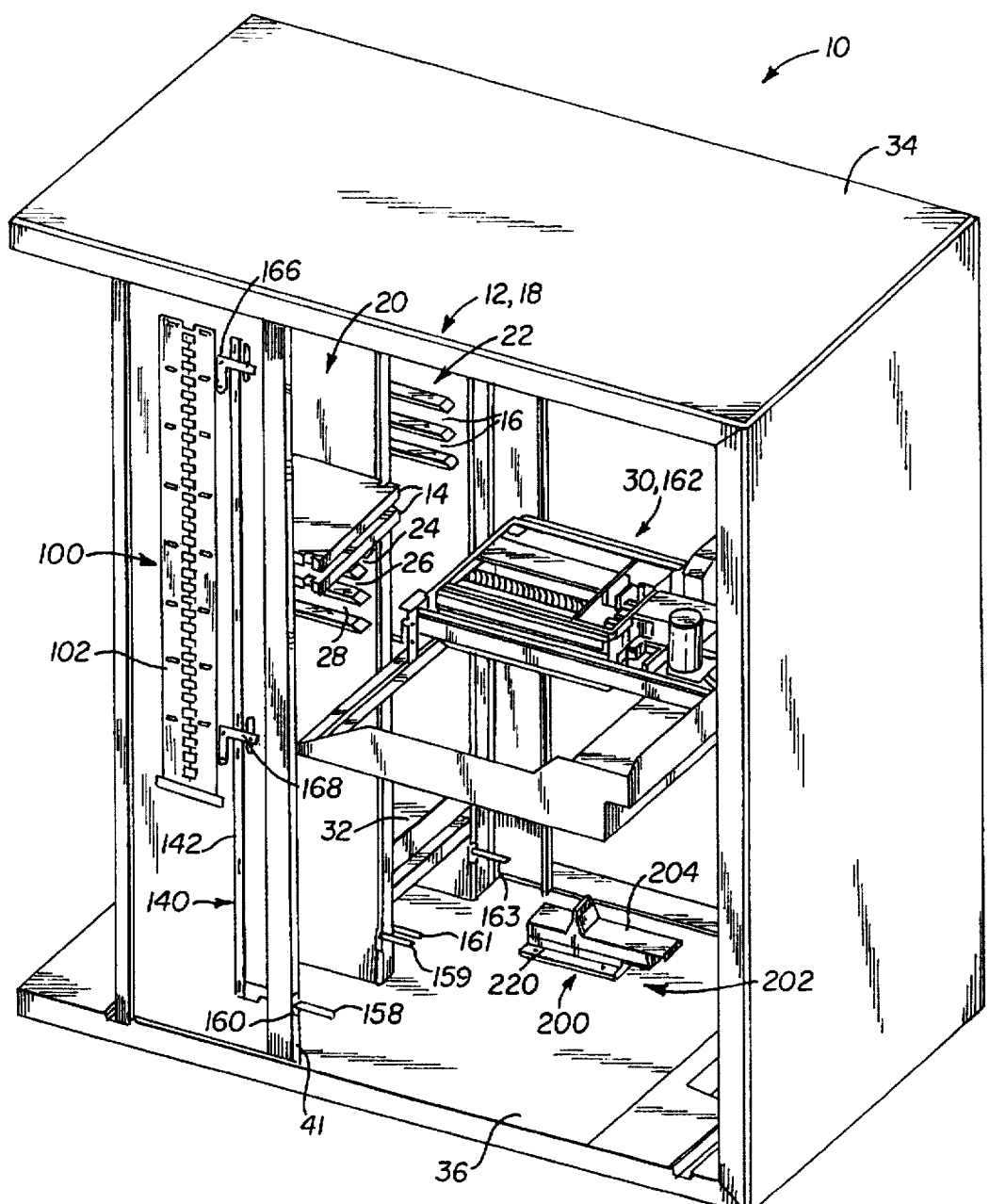
FIG. 1 is a schematic perspective view of a cartridge handling system utilizing a cartridge locking apparatus and a cartridge engaging assembly lock-down apparatus.

FIG. 1 illustrates a cartridge handling system 10 utilizing a cartridge locking apparatus 100 and a cartridge engaging assembly lock-down apparatus 200. In general, a cartridge handling system 10 may comprise a cartridge storage system 12 for storing a plurality of cartridges 14 within a plurality of corresponding storage locations 16 in a fixed storage array 18. The fixed storage array 18 may consist of any desired combination of vertical columns 20, 22 (only two shown) and horizontal rows (e.g., 24, 26, 28) of storage locations 16. The storage locations 16 in the fixed storage array 18 are preferably substantially identical.

Figure 2:
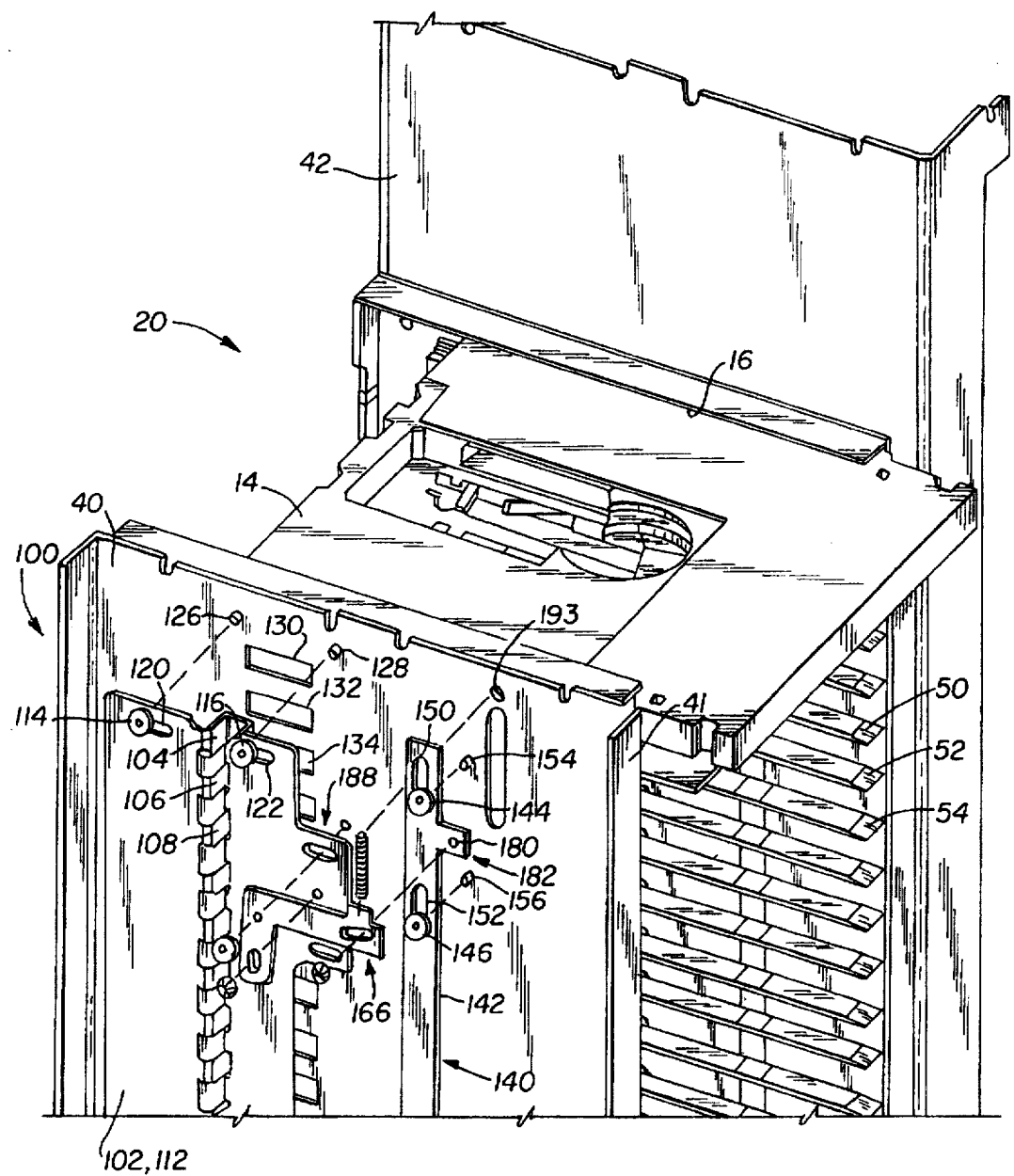
FIG. 2 is a partially exploded, detailed, schematic perspective view of the cartridge locking apparatus of FIG. 1.

As shown in FIG. 2, each column, e.g., 20, of storage locations 16 preferably comprises a first sidewall 40 and a substantially identical second sidewall 42. The sidewalls 40, 42 may have attached thereto a plurality of shelves, e.g., 50, 52, 54, which are adapted to support cartridges 14 and define the storage locations 16. Each storage location 16 may comprise one or more resilient cartridge retainers 60, 62 (FIGS. 3 and 4) which engage a cartridge 14 to releasably hold it in place within a corresponding storage location 16 as described in further detail below with reference to FIGS. 3 and 4.

As shown in FIG. 1, the cartridge handling system 10 may also comprise a cartridge engaging assembly 30 which is adapted to, for example, retrieve cartridges 14 and displace them horizontally among the columns 20, 22 (only two shown) and vertically among the rows (e.g., 24, 26, 28) of the fixed storage array 18. Vertical displacement of the cartridge engaging assembly 30 may be accomplished using any conventionally-known linear displacement apparatus, or a linear displacement apparatus such as that described in U.S. Pat. No. 5,596,556 issued Jan. 21, 1997 for LINEAR DISPLACEMENT AND SUPPORT APPARATUS FOR USE IN A CARTRIDGE HANDLING SYSTEM of Luffel et al., which was incorporated by reference above. Such a linear displacement apparatus is typically operatively connected to an electric motor (not shown). When power to a motor-driven linear displacement apparatus (not shown) is disconnected either manually (for example, using a switch) or unintentionally (for example, because of a power outage), oftentimes the cartridge engaging assembly will fall by its own weight and the force of gravity to the bottom (36, FIG. 1) of the cartridge handling system.

Referring to FIG. 1, the cartridge handling system 10 may further comprise disk or tape drives 32 (only one shown) positioned within or adjacent to the fixed storage array 18 which is adapted to receive cartridges 14 from the cartridge engaging assembly 30. The cartridge handling system 10 may be situated within a housing 34 as shown in FIG. 1.

The cartridge locking apparatus 100 of the cartridge handling system 10 is adapted to simultaneously lock a plurality of cartridges 14 within a plurality of corresponding storage locations 16 in a fixed storage array 18. The cartridge engaging assembly lock-down apparatus 200 is adapted to secure the cartridge engaging assembly 30 to a fixed housing portion 202 of the cartridge handling system 10. The cartridge locking apparatus 100 and cartridge engaging assembly lock-down apparatus 200 may be utilized, for example, to prevent damage to the cartridges 14 and cartridge engaging assembly 30 during transportation of the cartridge handling system 10.

Cartridge Locking Apparatus in General

Figure 3:
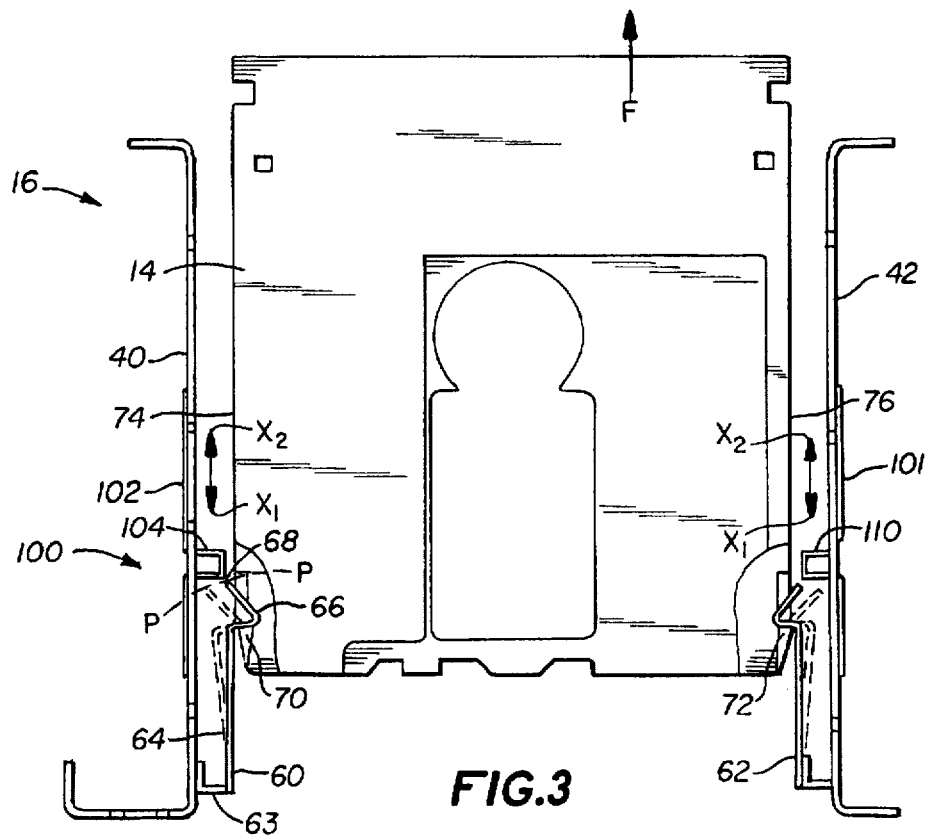
FIG. 3 is a plan view of a cartridge storage location utilizing the cartridge locking apparatus of FIG. 1 in an unlocked operating state.
Figure 4:
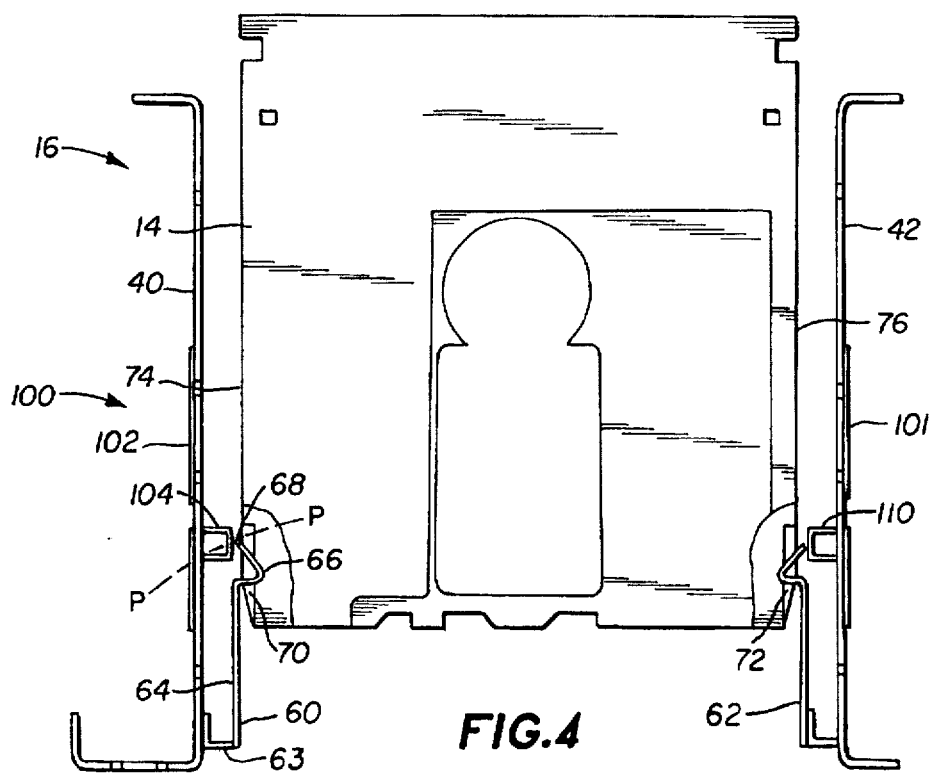
FIG. 4 is a plan view of a cartridge storage location utilizing the cartridge locking apparatus of FIG. 1 in a locked operating state.

The cartridge locking apparatus 100 is illustrated in FIGS. 1–5. Referring to FIGS. 3 and 4, the apparatus 100 may comprise resilient cartridge retainers 60, 62 positioned within each cartridge storage location 16 to releasably hold a cartridge 14 in place within the storage location 16. To release a cartridge 14 from its storage location 16, a force "F", FIG. 3, sufficiently large to overcome the biasing force of the cartridge retainers 60, 62 is exerted on the cartridge 14. The force "F" may be the pulling force of a cartridge engaging assembly (30, FIG. 1) as it retrieves a cartridge for transport to, for example, a disk drive (32, FIG. 1). A cartridge 14 may also be unintentionally released from its storage location 16 through jarring and jostling of the cartridge handling system 10 which may take place during transportation of the system as discussed above. As a cartridge 14 is released, the cartridge retainers 60, 62 are deflected into the position shown in phantom in FIG. 3.

The cartridge locking apparatus 100 may also comprise a cartridge locking device 102 (FIGS. 2–4). As best shown in FIG. 2, the cartridge locking device 102 may comprise a plurality of retainer stop portions, e.g., 104, 106, 108. Each retainer stop portion (e.g., 104) is positioned adjacent to a cartridge retainer (e.g., 60) and coacts with that resilient cartridge retainer as illustrated in FIG. 4 to prevent the cartridge retainer from releasing a cartridge 14. Displacement of the cartridge locking device 102 causes all of the retainer stop portions, e.g., 104, 106, 108 to be simultaneously displaced therewith. In this manner, displacement of the cartridge locking device 102 allows the retainer stop portions, e.g., 104, 106, 108 (FIG. 2) to coact simultaneously with adjacent cartridge retainers (see, for example, cartridge retainer 60 coacting with retainer stop portion 104, FIGS. 3 and 4).

The cartridge locking device 102 comprises an unlocked operating state, illustrated in FIGS. 1–3, whereby each retainer stop portion, e.g., 104 (FIG. 3) is positioned away from the deflection path "PP" of a corresponding resilient cartridge retainer, e.g., 60 (FIG. 3). In an unlocked operating state, the cartridge retainer 60 is not prevented from being deflected into the position shown in phantom in FIG. 3, and thus the cartridge 14 held thereby may be released from its storage location 16. The cartridge locking device 102 also comprises a locked operating state, illustrated in FIGS. 4 and 5, whereby each retainer stop portion, e.g., 104 (FIG. 4) is positioned within the deflection path "PP" of a resilient cartridge retainer, e.g., 60 (FIG. 4), thus blocking deflection of the retainer. In a locked operating state, each retainer is prevented from being deflected, thus locking each cartridge 14 in place within their corresponding storage locations 16.

Figure 5:
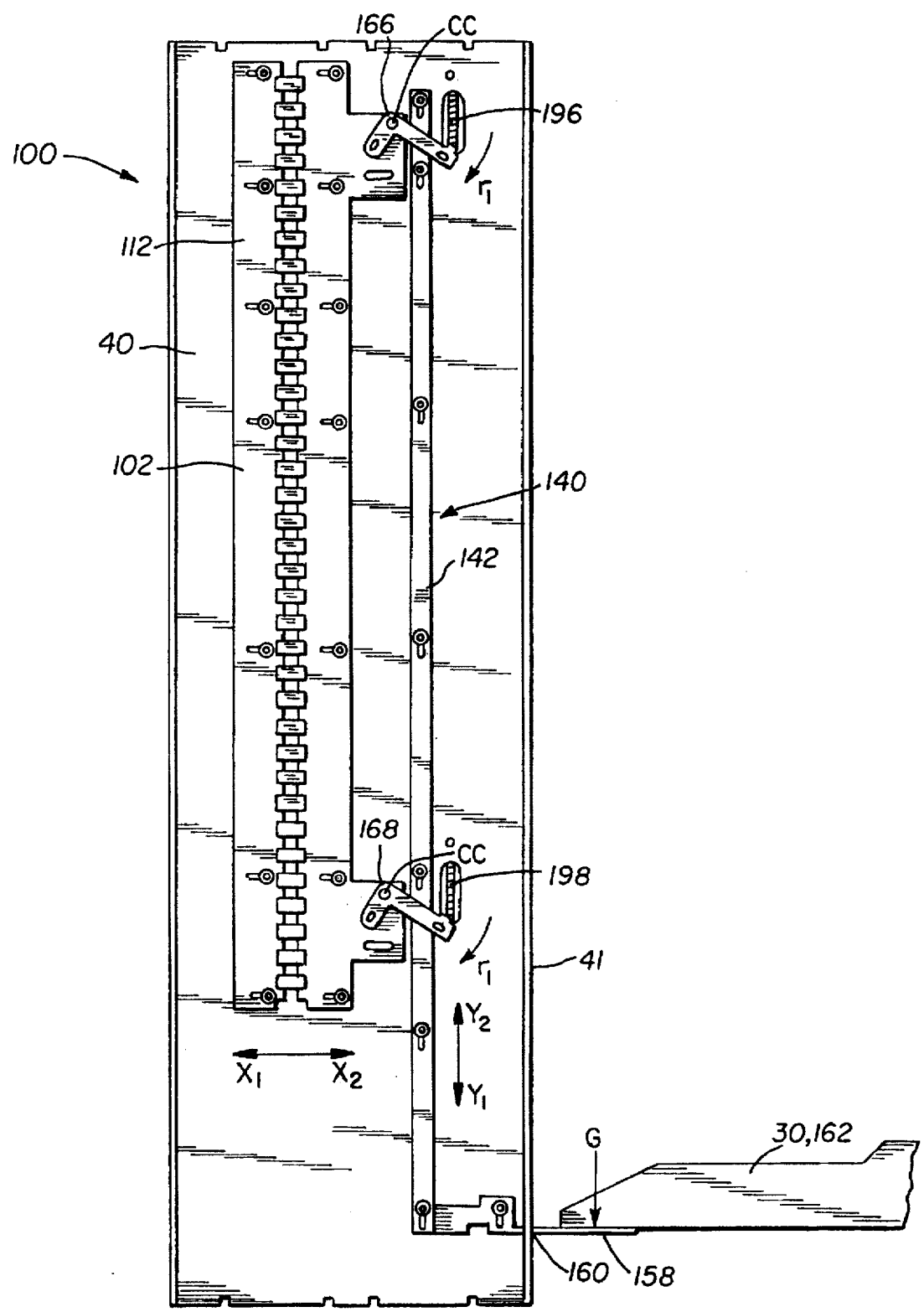
FIG. 5 is a side view of the cartridge locking apparatus of FIG. 1 in a locked operating state.

To selectively place the cartridge locking device 102 in an unlocked operating state (FIGS. 1–3) or a locked operating state (FIGS. 4 and 5), the cartridge locking apparatus 100 further comprises a cartridge locking device actuator 140. As best shown in FIG. 5, the actuator 140 may comprise a substantially L-shaped, elongate actuator member 142, one or more pivot members 166, 168, and a biasing device 196. The actuator may further comprise an actuator engagement apparatus 162, which is preferably comprised of the cartridge engaging assembly 30 as shown in FIG. 5. To place the cartridge locking device 102 in a locked operating state, the actuator engagement apparatus 162 exerts a downward force "G" on an extending portion 158 of the elongate actuator member 142, which displaces the elongate actuator member 142 in direction "$Y_1$". The pivot members 166, 168, which are each attached to the elongate actuator member 142 and the cartridge locking device 102, translate displacement of the elongate actuator member 142 in direction "$Y_1$" into linear displacement of the cartridge locking device 102 in direction "$X_1$", shifting the cartridge locking device 102 into a locked operating state (FIGS. 4 and 5). To return the cartridge locking device 102 to an unlocked operating state, the actuator engagement apparatus 162 disengages the elongate actuator member 142. Biasing force exerted by the biasing device 196 displaces the actuator member 142 in the "$Y_2$" direction. The pivot members translate displacement of the actuator member 142 in direction "$Y_2$" into displacement of the cartridge locking device 102 in direction "$X_2$", returning the cartridge locking device 102 to an unlocked operating state, FIGS. 1–3.

Having thus described the cartridge locking apparatus 100 in general, specific features of the cartridge locking apparatus 100 will now be described in further detail.

Resilient Cartridge Retainers

As shown in FIGS. 3 and 4, each cartridge storage location 16 preferably includes one or more (and most preferably two) resilient cartridge retainers 60, 62. In a preferred embodiment as shown in FIGS. 3 and 4, each resilient cartridge retainer 60, 62 engages an indentation 70, 72, respectively, on each side 74, 76 of the cartridge 14 to releasably hold the cartridge 14 in place within its storage location 16. In an alternative embodiment (not shown), only one resilient cartridge retainer (e.g., 60) is provided which engages an indentation (e.g., 70) in the cartridge 14, and the opposite side (e.g., 76) of the cartridge 14 abuts against a sidewall (e.g., 42). It should be noted that, in the preferred embodiment shown in FIGS. 3 and 4, a cartridge locking apparatus 100, 101 is mounted on each sidewall 40, 42, respectively, adjacent to each of the resilient cartridge retainers 60, 62, respectively. In the alternative embodiment described above wherein only one resilient cartridge retainer (e.g., 60) is provided, only one cartridge locking apparatus (e.g., 100) is mounted on the sidewall (e.g., 40) adjacent to the resilient cartridge retainer (e.g., 60). It should also be noted that, in cartridge handling systems such as that shown in FIG. 1 which have multiple columns (e.g., 20, 22, FIG. 1) of storage locations 16, each column 20, 22 may have associated therewith two cartridge locking apparatuses (e.g., 100, 101). The cartridge locking apparatuses (e.g., 100, 101) are preferably either substantially identical or mirror images of one another (depending upon the orientation in which it is mounted on a sidewall, e.g., 40, 42). Thus, the description herein with respect to the cartridge locking apparatus 100 may apply to any cartridge locking apparatus (e.g., 101) utilized in the cartridge handling system (10, FIG. 1).

Each of the cartridge retainers 60, 62 may be comprised of biasing devices such as leaf springs. The cartridge retainers 60, 62 may be substantially identical, thus the description below with respect to cartridge retainer 60 may also apply to cartridge retainer 64.

As shown in FIGS. 3 and 4, the cartridge retainer 60 may comprise a spacer portion 63 attached to an associated sidewall 40, an elongate portion 64, and a substantially V-shaped portion 66 with a free terminal end 68. Each cartridge retainer 60, 62 comprises a cartridge hold position, shown in solid lines in FIG. 3, and a cartridge release position, shown in phantom in FIG. 3. In the cartridge hold position, the substantially V-shaped portion (e.g., 66) of each cartridge retainer (e.g., 60) is nested within an indentation (e.g., 70) in the cartridge 14, thereby holding the cartridge 14 in place within the storage location 16. In the cartridge release position, each cartridge retainer 60, 62 is deflected away from the cartridge 14, allowing the cartridge 14 to be released from its storage location 16.

Each cartridge retainer 60, 62 is biased inwardly, i.e., biased against outward deflection, and thus normally remains in the cartridge hold position shown in solid lines in FIG. 3. A sufficiently high force "F" on the cartridge 14 may overcome the inward biasing force of the retainers 60, 62, causing displacement of the cartridge 14 in the direction of the force "F". Such displacement dislodges the substantially V-shaped portion (e.g., 66) of each cartridge retainer (e.g., 60) from the indentation (e.g., 70) in the cartridge 14 and deflects the cartridge retainers 60, 62 into the cartridge release position shown in phantom in FIG. 3. The deflection path "PP" of a cartridge retainer (e.g., 60) (and specifically the terminal end 68 thereof) is indicated in FIGS. 3 and 4.

Cartridge Locking Device

The cartridge locking device 102, FIG. 2, coacts simultaneously with all of the resilient cartridge retainers (e.g., 60, FIGS. 3 and 4) positioned adjacent thereto to prevent the cartridge retainers from releasing cartridges 14 from their storage locations 16. The cartridge locking device 102 preferably comprises a plurality of retainer stop portions (e.g., 104, 106, 108, FIGS. 2–4). Each retainer stop portion (e.g., 104) coacts with a resilient cartridge retainer (e.g., 60) as shown in FIGS. 3 and 4. The retainer stop portions (e.g., 104, 106, 108) are fixedly positioned on the cartridge locking device 102 such that displacement of the cartridge locking device 102 causes all of the retainer stop portions 104, 106, 108 to be simultaneously displaced therewith.

More specifically, the cartridge locking device 102 may comprise an elongate plate 112, FIG. 2. The retainer stop portions, e.g., 104, 106, 108, may be integrally formed with the elongate plate 112 or otherwise fixedly secured thereto. The elongate plate 112 may be slidably secured to the first sidewall 40 with a plurality of sliding connectors, e.g., 114, 116. In particular, the elongate plate 112 may comprise a plurality of substantially identical, horizontally disposed slots, e.g., 120, 122 in alignment with circular openings, e.g., 126, 128, in the sidewall 40 which receive the sliding connectors 114, 116 as indicated in FIG. 2. The slots 120, 122 define the directions "$X_1$" and "$X_2$" (FIG. 5) in which the elongate plate 112 may slide. The retainer stop portions, e.g., 104, 106, 108, preferably pass through a plurality of cutout portions, e.g., 130, 132, 134 (FIG. 2) in the sidewall 40 and extend into the cartridge storage locations 16 as shown in FIGS. 3 and 4. The retainer stop portions, e.g., 104, 106, 108, may alternatively pass through a single elongate cutout portion (not shown) in the sidewall 40 to extend into the cartridge storage locations 16 as shown in FIGS. 3 and 4.

The cartridge locking device 102 comprises an unlocked operating state, illustrated in FIGS. 1-3, whereby each retainer stop portion (e.g., 104, FIG. 3) is positioned away from the deflection path "PP" of a corresponding resilient cartridge retainer (e.g., 60, FIG. 3). In an unlocked operating state, the cartridge retainers may be deflected into a cartridge release position (shown in phantom in FIG. 3 and described above) to release cartridges 14. The cartridge locking device 102 also comprises a locked operating state, illustrated in FIGS. 4 and 5, whereby each retainer stop portion (e.g., 104, FIG. 4) is positioned within the deflection path "PP" of a resilient cartridge retainer (e.g., 60, FIG. 4), thus blocking deflection of the retainer. As shown in FIG. 4, in the locked operating state, the retainer stop portion 104 is preferably positioned directly adjacent to the terminal end 68 of the resilient cartridge retainer 60. In a locked operating state, the cartridge retainers are maintained in the cartridge hold position as shown in FIG. 4 and described above, thus locking each cartridge 14 in place within its storage locations 16.

Cartridge Locking Device Actuator

The cartridge locking device actuator 140, FIG. 2, selectively places the cartridge locking device 102 in an unlocked operating state (FIGS. 1-3) or a locked operating state (FIGS. 4 and 5). As best shown in FIG. 2, the actuator 140 may comprise an elongate actuator member 142 which is slidably secured to the first sidewall 40 such as with a plurality of sliding connectors, e.g., 144, 146, or the like. In particular, the actuator member 142 may comprise a plurality of substantially identical, vertically disposed slots, e.g., 150, 152, in alignment with circular openings, e.g., 154, 156, in the sidewall 40 which receive the sliding connectors, e.g., 144, 146 as indicated in FIG. 2. The slots 150, 152 define the directions "$Y_1$" and "$Y_2$" (FIG. 5) in which the actuator member 142 may slide. The actuator member 142 is preferably substantially L-shaped as shown in FIGS. 1 and 5 and comprises an extending portion 158 which may pass through a longitudinal opening 160 in a laterally extending edge portion 41 (FIGS. 1, 2 and 5) of the sidewall 40. The extending portion 158 may be engaged by an actuator engagement apparatus 162 as described in further detail below.

Referring to FIGS. 2 and 5, the actuator 140 may further comprise one or more (and preferably two) substantially identical pivot members 166, 168 (both shown in FIG. 5) which translate linear displacement of the actuator member 142 in direction "$Y_1$" or "$Y_2$" into linear displacement of the cartridge locking device 102 in direction "$X_1$" or "$X_2$", respectively. It is to be understood that the pivot members 166, 168 preferably perform substantially identical functions, and thus the description below with regard to pivot member 166 may also apply to pivot member 168.

Figure 2A:
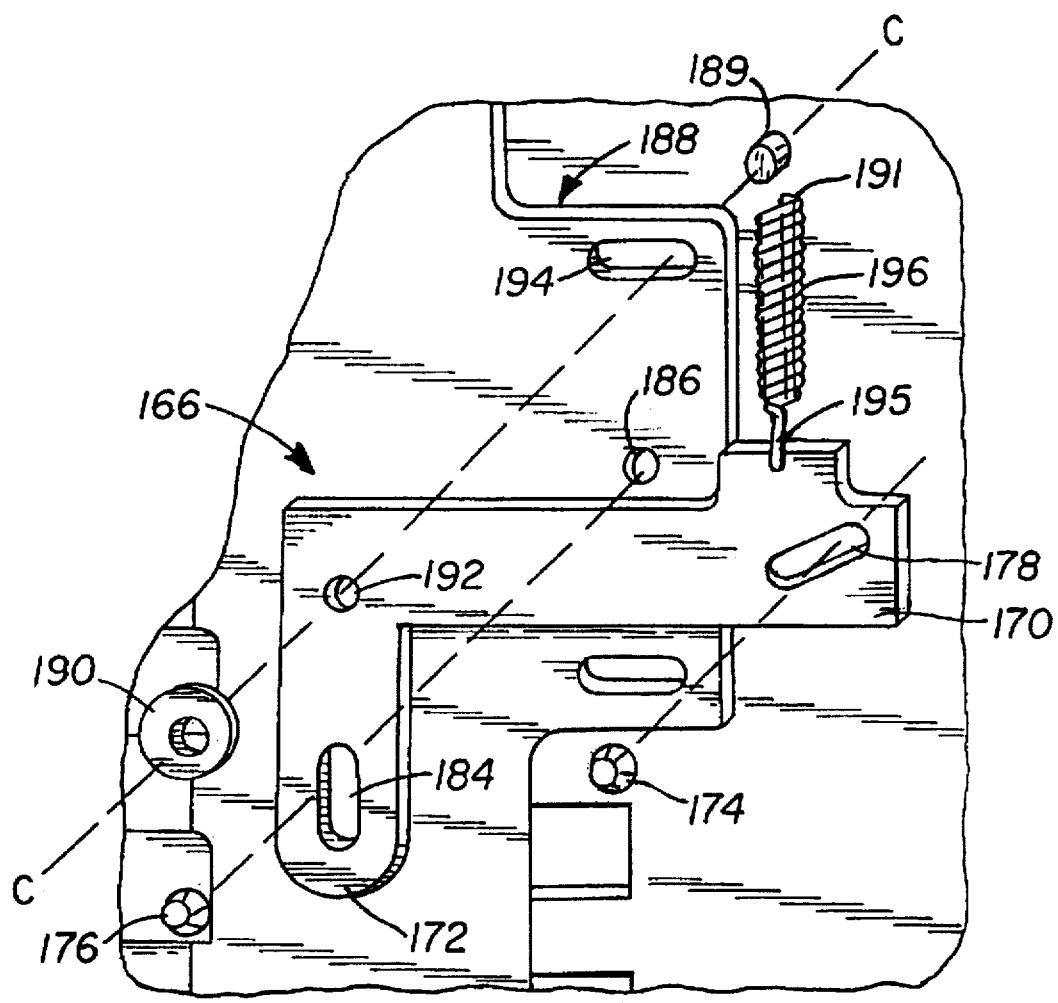
FIG. 2a is an enlarged view of a portion of the cartridge locking apparatus of FIG. 2.

Referring to FIGS. 2 and 2a, the pivot member 166 preferably comprises a first portion 170 rotatably secured to the actuator member 142 and a second portion 172 rotatably secured to the cartridge locking device elongate plate 112 with pivot connectors 174, 176, respectively. More specifically, the pivot member 166 first portion 170 may comprise a first slot opening 178 in alignment with a circular opening 180 in the actuator member 142, which may be located at a tab portion 182 of the actuator member 142 as shown in FIG. 2. The pivot member 166 second portion 172 may comprise a second slot opening 184 in alignment with a circular opening 186 in the locking device elongate plate 112, which may be located at a tab portion 188 of the locking device elongate plate 112 as shown. The openings 178, 180 and 184, 186 may receive pivot connectors 174, 176, respectively, as shown.

The pivot member 166 is also preferably pivotably secured to the first sidewall 40 with a pivot connector 190. The pivot member 166 pivots about fixed pivot axis "CC". The pivot member 166 may comprise a circular opening 192 in alignment with a circular opening 189 in the sidewall 40 which receive the pivot connector 190, thus defining pivot axis "CC". The pivot connector 190 may also pass through a slot opening 194 in the locking device elongate plate 112 as shown in FIG. 2. Alternatively (not shown), the pivot connector 190 may circumvent the locking device elongate plate 112, i.e., the tab portion 188 of the locking device elongate plate 112 may be shaped such that the tab portion 188 does not pass between the openings 189, 192 in the first sidewall 40 and the pivot member 166, respectively.

As noted above, the actuator 140 may further comprise an actuator engagement apparatus 162 (FIG. 5) to displace the actuator member 142 in direction "$Y_1$". In a preferred embodiment, the actuator engagement apparatus 162 is comprised of a cartridge engaging assembly 30 as shown in FIGS. 1 and 5. It is to be understood that, although in the preferred embodiment described below a cartridge engaging assembly 30 acts as the actuator engagement apparatus 162, any actuator engagement apparatus capable of displacing the actuator member 142 may be employed.

As illustrated in FIG. 5, to displace the actuator member 142 in direction "$Y_1$", the cartridge engaging assembly 30 engages the actuator member 142 extending portion 158 and applies a force "G" thereto. As the elongate actuator member 142 is linearly displaced in direction "$Y_1$", the pivot member 166 (and pivot member 168) attached thereto rotates around pivot axis "CC" in direction "$r_1$". Such rotation of the pivot member 166 causes the cartridge locking device 102 attached thereto to be linearly displaced in direction "$X_1$", which shifts the cartridge locking device 102 into a locked operating state (FIGS. 4 and 5). It can be seen in FIGS. 2 and 2a that the openings 178, 184 in the pivot member first and second portions 170, 172, respectively, may be somewhat elliptical to compensate for the rotational displacement of the pivot member 166 while the elongate actuator member 142 and cartridge locking device 102 attached thereto are linearly displaced. As shown in FIG. 1, in a cartridge handling system 10 with multiple cartridge locking apparatuses, the extending portions 158, 159, 161, 163 of the actuator members 142 (only one shown) may be horizontally aligned such that the cartridge engaging assembly 30 may contact the extending portions 158, 159, 161, 163 simultaneously.

As shown in FIG. 5, each pivot member 166, 168 may have associated therewith a biasing device 196, 198, respectively, to return the cartridge locking device 102 to an unlocked operating state. As shown in FIGS. 2 and 2a, each biasing device (e.g., 196) is attached at one end 191 to the sidewall 40 at connection point 193 and at the other end 195 to a pivot member (e.g., 166). To return the cartridge locking device 102 to an unlocked operating state, the cartridge engaging assembly 30 is displaced in direction "$Y_2$" and is disengaged from the elongate actuator member 142, removing the force "G" therefrom. With the force "G" removed from the actuator member 142, biasing force exerted by each biasing device (e.g., 196) displaces the actuator member 142 in the "$Y_2$" direction. The pivot member 166 translates displacement of the actuator member 142 in direction "$Y_2$" into displacement of the cartridge locking device 102 in direction "$X_2$", thereby returning the cartridge locking device 102 to an unlocked operating state (FIGS. 1–3).

As discussed above with reference to the cartridge handling system 10 (FIG. 1), the cartridge engaging assembly 30 is preferably displaceable in directions "$Y_1$" and "$Y_2$" (FIG. 5) using a motor-driven linear displacement apparatus (not shown). Thus, the cartridge locking device 102 may be placed in a locked operating state (FIGS. 4 and 5) or an unlocked operating state (FIGS. 1–3) by using a motor-driven linear displacement apparatus (not shown). Also as discussed above, with loss of power to the linear displacement apparatus (not shown), the cartridge engaging assembly 30 may fall by its own weight and the force of gravity in direction "$Y_1$" (FIG. 5) to the bottom 36 of the cartridge handling system 10, thereby automatically displacing the actuator member 142. Thus, with a loss of power, the cartridge locking device 102 may be placed in a locked operating state (FIGS. 4 and 5) automatically.

Cartridge Engaging Assembly Lock-Down Apparatus

The cartridge engaging assembly lock-down apparatus 200, a preferred embodiment of which is illustrated in FIGS. 1 and 6–9, is adapted to secure the cartridge engaging assembly 30 to a fixed housing portion 202 (FIGS. 1, 8 and 9) of the cartridge handling system 10 (FIG. 1). As shown in FIGS. 6–9, the lock-down apparatus 200 may comprise a first lock-down member 204 comprising a raised track portion 206, a shelf portion 208, and an upwardly extending portion 210. The lock-down apparatus 200 may also comprise a second lock-down member 220 comprising a channel portion 222 and a substantially flat, smooth mounting surface 224.

Figure 6:
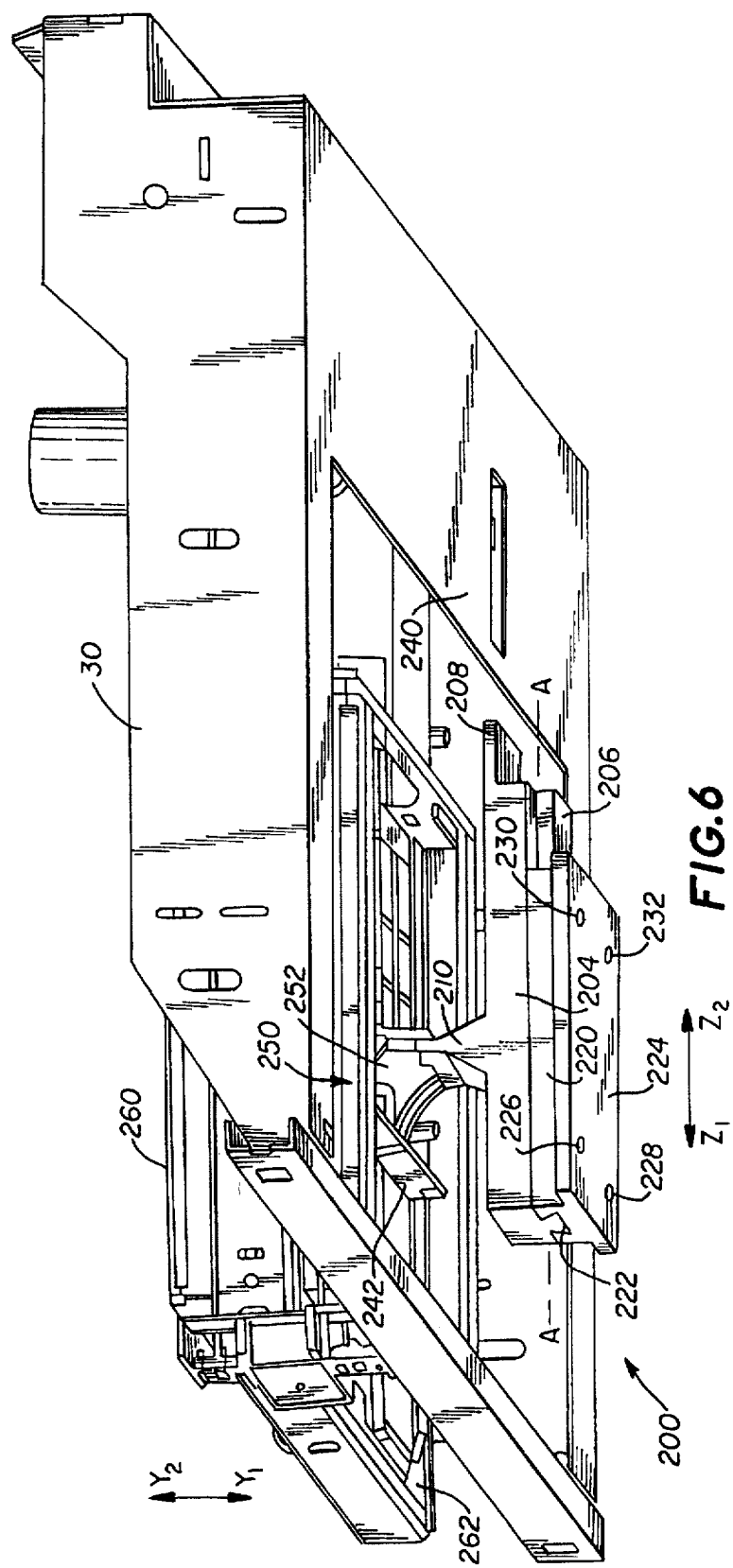
FIG. 6 is a schematic perspective view of a cartridge engaging assembly together with the cartridge engaging assembly lock-down apparatus of FIG. 1 in an unlocked operating state.
Figure 7:
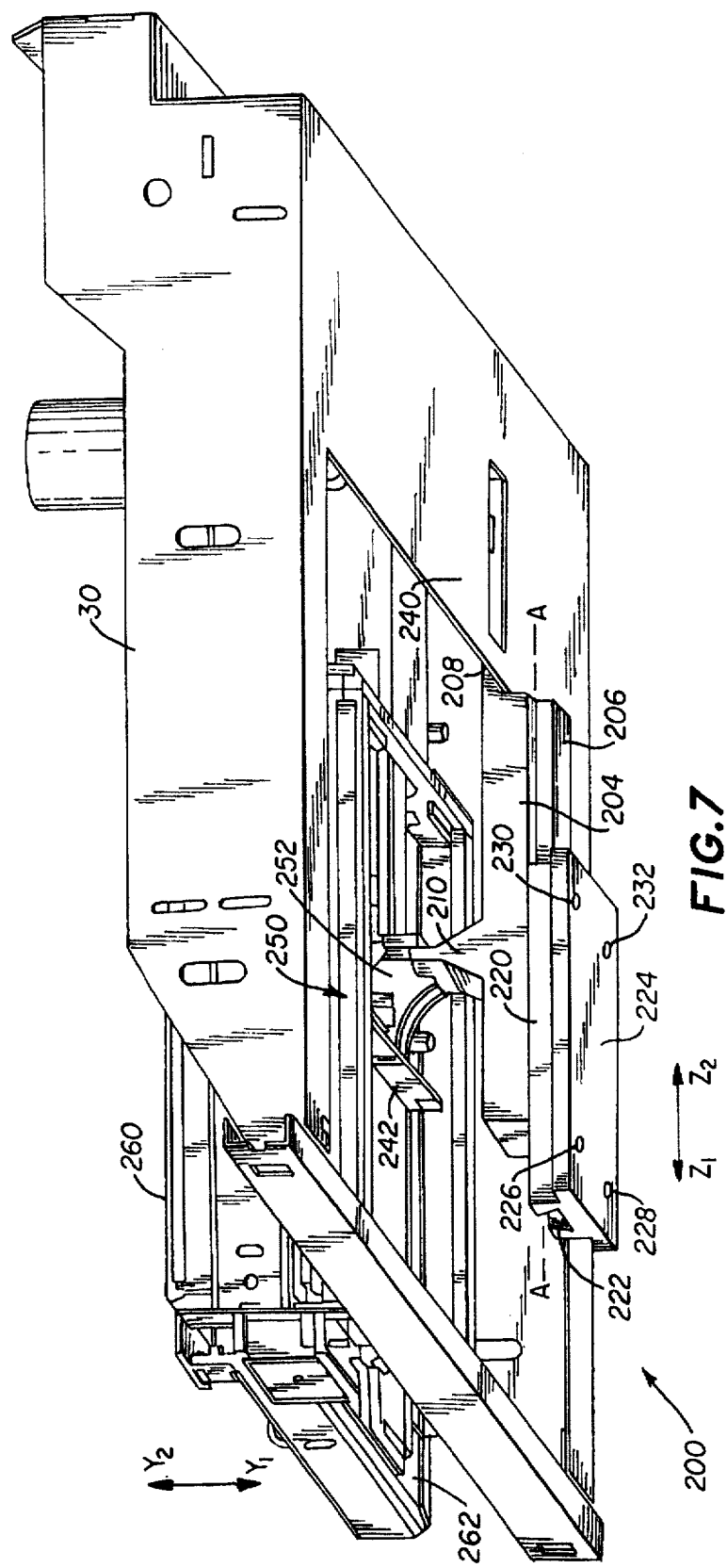
FIG. 7 is a schematic perspective view of the cartridge engaging assembly utilizing the cartridge engaging assembly lock-down apparatus of FIG. 6 in a locked operating state.
Figure 8:
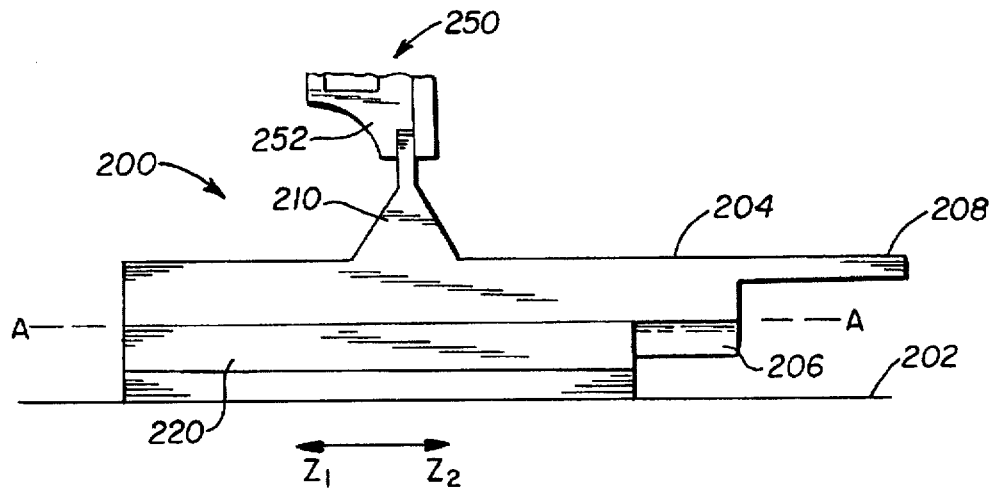
FIG. 8 is a side view of the cartridge engaging assembly lock-down apparatus of FIGS. 6 and 7.
Figure 9:
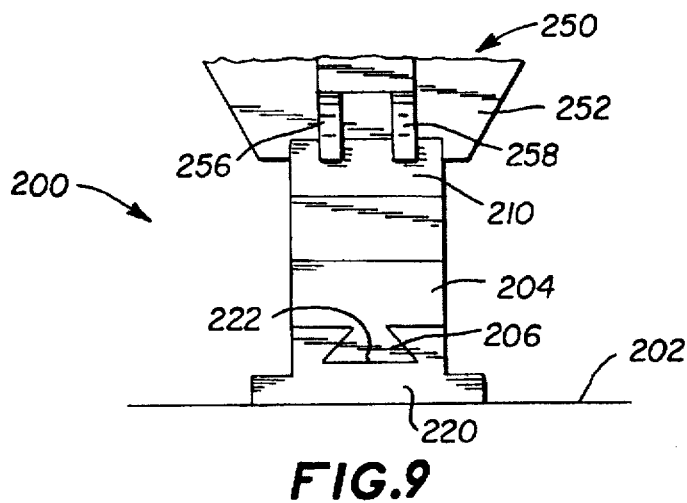
FIG. 9 is an end view of the cartridge engaging assembly lock-down apparatus of FIGS. 6 and 7.

In a preferred embodiment, the first lock-down member 204 raised track portion 206 is slidably mounted within the second lock-down member 220 channel portion 222. As best shown in FIGS. 6, 7 and 9, the first lock-down member 204 raised track portion 206 may comprise a "flared" shape, and the second lock-down member 220 channel portion 222 may comprise a corresponding interlockable shape, such that the first lock-down member 204 is restricted to slidable displacement in the "$Z_1$" or "$Z_2$" direction along axis "AA". It is to be understood that the raised track portion 206 and channel portion 222 may comprise any interlockable shape such that the first lock-down member 209 is restricted from displacement in the "$Y_1$" direction. The second lock-down member 220 is preferably nondisplaceably secured at the mounting surface 224 thereof to the fixed housing portion 202 (FIGS. 1, 8 and 9), which may be the bottom of the housing as shown in FIG. 1. The second lock-down member 220 may be secured to the fixed housing portion 202 with screws (not shown) or the like which may pass through the fixed housing portion 202 and be inserted into mounting holes 226, 228, 230, 232 (FIGS. 6 and 7) on the second lock-down member mounting surface 224.

The lock-down apparatus comprises a locked operating state, FIG. 7, whereby the first lock-down member 204 shelf portion 208 is engaged with the cartridge engaging assembly 30, preferably at a portion 240 of the frame of the cartridge engaging assembly 30. In the locked operating state, the first lock-down member 204 shelf portion 208 preferably slides over the cartridge engaging assembly frame portion 240 as shown in FIG. 7, thereby preventing displacement of the cartridge engaging assembly 30 in the "$Y_1$" direction. As described above, the first lock-down member 204 is slidably attached to the second lock-down member 220, which is nondisplaceably secured to the fixed housing portion 202 of the cartridge handling system 10. In this manner, the cartridge engaging assembly 30 is secured to the fixed housing portion 202 of the cartridge handling system 10 in the locked operating state.

The lock-down apparatus 200 also comprises an unlocked operating state, FIG. 6, whereby the first lock-down member 204 shelf portion 208 is disengaged from the cartridge engaging assembly 30. In the unlocked operating state, the cartridge engaging assembly 30 is not restricted from displacement in the "$Y_1$" direction. In the unlocked operating state, the cartridge engaging assembly 30 may be displaced in the "$Y_1$" or "$Y_2$" direction using a remotely-controllable, motor-driven linear displacement apparatus (not shown) such as that described above with respect to the cartridge handling system 10.

The lock-down apparatus 200 may further comprise a lock-down member actuator 250 to selectively place the first lock-down member 204 in an unlocked operating state, FIG. 6, or a locked operating state, FIG. 7. The lock-down member actuator 250 may comprise an engagement portion 252 which is engageable with the first lock-down member 204 upwardly extending portion 210. As best shown in FIG. 8, the engagement portion 252 may be substantially U-shaped in cross-section. As best shown in FIG. 9, the cross-sectional shape of the engagement portion 252 need not be continuous, i.e., the engagement portion 252 may comprise extending legs 258, 256 which form part of the U-shaped cross section.

In a preferred embodiment, the lock-down member actuator 250 is operatively connected to a remotely-controllable, motor-driven drive mechanism (not shown) which provides energy to displace the engagement portion 252 in the "$Z_1$" and "$Z_2$" directions. For the cartridge engaging assembly 30 to be self-locking, the drive mechanism is preferably a component part of the cartridge engaging assembly 30, i.e., the drive mechanism may also provide energy to displace a portion 242 of the cartridge engaging assembly 30 in the "$Z_1$" and "$Z_2$" directions to, for example, retrieve cartridges (e.g., 14, FIG. 1) from and insert cartridges into their storage locations (e.g., 16, FIG. 1); and retrieve cartridges from and insert cartridges into disk or tape drives (e.g., 32, FIG. 1). Such a drive mechanism is described in U.S. Pat. No. 5,014,255 dated May 7, 1991 for OPTICAL DISK CARTRIDGE HANDLING APPARATUS WITH PASSIVE CARTRIDGE ENGAGEMENT ASSEMBLY of Wanger et al., which was incorporated by reference above.

It should be noted that the present invention may be utilized with a dual cartridge engaging assembly such as that described in copending U.S. Pat. No. 5,638,349 dated Jun. 10, 1997 for CARTRIDGE HANDLING SYSTEM WITH DUAL CARTRIDGE ENGAGING ASSEMBLY of Rugg et al., and illustrated at 30 in FIGS. 6 and 7. Portions of such a dual cartridge engaging assembly 30 may be flipped to reverse the relative positions of the sides 260, 262 indicated in FIGS. 6 and 7. Substantially identical actuators 250 (only one shown) may be located at both sides 260, 262 of the cartridge engaging assembly 30 such that the cartridge engaging assembly lock-down apparatus 200 may be utilized regardless of which side 260, 262 is facing the lock-down members 204, 220 at any given time.

To place the cartridge handling system lock-down apparatus 200 in a locked operating state, FIG. 7, the lock-down member actuator 250 engagement portion 252 is aligned with the first lock-down member 204 upwardly extending portion 210. Then, the cartridge engaging assembly 30 is displaced in the "$Y_2$" direction to engage the lock-down member actuator 250 extending portion 252 with the first lock-down member 204 upwardly extending portion 210. Once engaged, the lock-down member actuator 250 extending portion 252 is displaced in the "$Z_2$" direction to engage the first lock-down member 204 shelf portion 208 with the cartridge engaging assembly 30 frame portion 240.

To place the cartridge handling system lock-down apparatus 200 in an unlocked operating state, FIG. 6, the lock-down member actuator 250 extending portion 252 is displaced in the "$Z_1$" direction to disengage the first lock-down member 204 shelf portion 208 from the cartridge engaging assembly 30 frame portion 240. The cartridge engaging assembly 30 is then free to move in the "$Y_1$" direction if desired.

Figure 10:
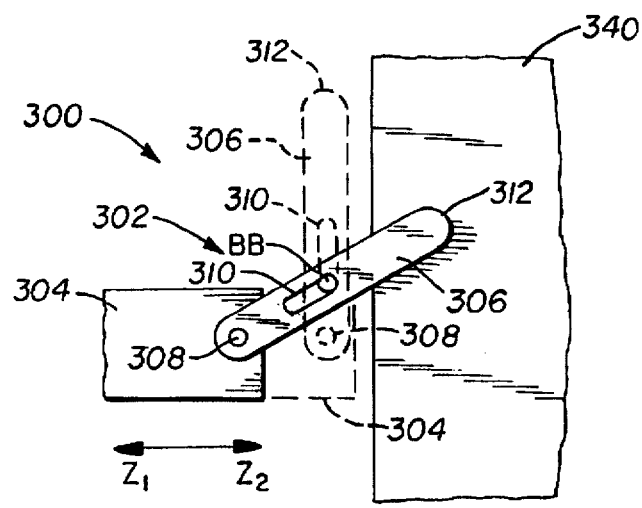
FIG. 10 is a plan view of another embodiment of the cartridge engaging assembly lock-down apparatus of FIGS. 6–9.

FIG. 10 illustrates another embodiment of the cartridge engaging assembly lock-down apparatus 300, which may be substantially identical to the cartridge engaging assembly lock-down apparatus 200, FIGS. 6–9, except where indicated otherwise.

As shown in FIG. 10, the lock-down apparatus 300 may comprise a first lock-down member 302 comprising a first displaceable portion 304 which is linearly displaceable in the "$Z_1$" or "$Z_2$" directions, and a second displaceable portion 306 rotatably attached to the first displaceable portion 304 by a pin 308 or the like. The second displaceable portion 306 is preferably also rotatably attached at a slot 310 to a fixed housing portion (e.g., 202, FIG. 1) of the cartridge handling system (10, FIG. 1) and is rotatable around a fixed pivot axis "BB". The slot 310 allows the second displaceable portion 306 to rotate around the fixed pivot axis "BB" while the first displaceable portion 304 and second displaceable portion 306 attached thereto are linearly displaced in the "$Z_1$" or "$Z_2$" directions. The second displaceable portion 306 may also comprise an engagement portion 312 which is engageable with the cartridge engaging assembly (e.g., 30, FIGS. 6 and 7), preferably at a frame portion 340 thereof, which may be identical to the frame portion 240 shown in FIGS. 6 and 7.

The lock-down apparatus 300 may also comprise a second lock-down member (not shown), to which the first lock-down member 302 may be slidably mounted, which is secured to a fixed housing portion (not shown) of the cartridge handling system (e.g., 10, FIG. 1). The second lock-down member of the lock-down apparatus 300 shown in FIG. 10 may be substantially identical to the second lock-down member 204 described above with reference to FIGS. 6–9.

The first lock-down member 302 comprises a locked operating state, shown in solid lines in FIG. 10, whereby the engagement portion 312 of the second displaceable portion 306 is engaged with the cartridge engaging assembly frame portion 340. The first lock-down member 302 also comprises an unlocked operating state, shown in phantom in FIG. 10, whereby the engagement portion 312 of the second displaceable portion 306 is disengaged from the cartridge engaging assembly frame portion 340.

To place the first lock-down member 302 in a locked operating state (solid lines), the first displaceable portion 304 is displaced in the "$Z_1$" direction. The second displaceable portion 306 attached thereto rotates around the fixed pivot axis "BB", causing the engagement portion 312 thereof to arcuately slide over the cartridge engaging assembly frame portion 340. The engagement portion 312 prevents displacement of the cartridge engaging assembly (e.g., 30, FIGS. 6 and 7) in the "$Y_1$" direction (FIGS. 6 and 7) in substantially the same manner as the shelf portion 208 described above.

To place the first lock-down member 302 in an unlocked operating state (phantom lines), the first displaceable portion 304 is displaced in the "$Z_2$" direction. The second displaceable portion 306 attached thereto rotates around the fixed pivot axis "BB", causing the engagement portion 312 thereof to disengage from the cartridge engaging assembly frame portion 340. The cartridge engaging assembly (e.g., 30, FIGS. 6 and 7) is then displaceable in the "$Y_1$" direction (FIGS. 6 and 7) as discussed above.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. An apparatus for securing a cartridge engaging assembly of a cartridge handling system to a fixed housing portion of said cartridge handling system, comprising:

a) a first lock-down member engageable with at least a portion of said cartridge engaging assembly, said first lock-down member comprising a locked operating state wherein said at least a portion of said cartridge engaging assembly is engaged by said first lock-down member and an unlocked operating state wherein said at least a portion of said cartridge engaging assembly is disengaged from said first lock-down member;

b) a second lock-down member nondisplaceably attached to said fixed housing portion, said first lock-down member being displaceably attached to said second lock-down member; and c) a lock-down member actuator attached to said cartridge engaging assembly and engageable with said first lock-down member to selectively place said first lock-down member in said locked operating state and said unlocked operating state.

2. The apparatus of claim 1 wherein said first lock-down member comprises:

a) a first displaceable portion engageable with said lock-down member actuator; and b) a second displaceable portion rotatably attached to said first displaceable portion and engageable with said at least a portion of said cartridge engaging assembly.

* * * * *